Nov. 7, 1961    F. HOBBS    3,007,213
JUNCTION MOLDING
Filed Feb. 14, 1955
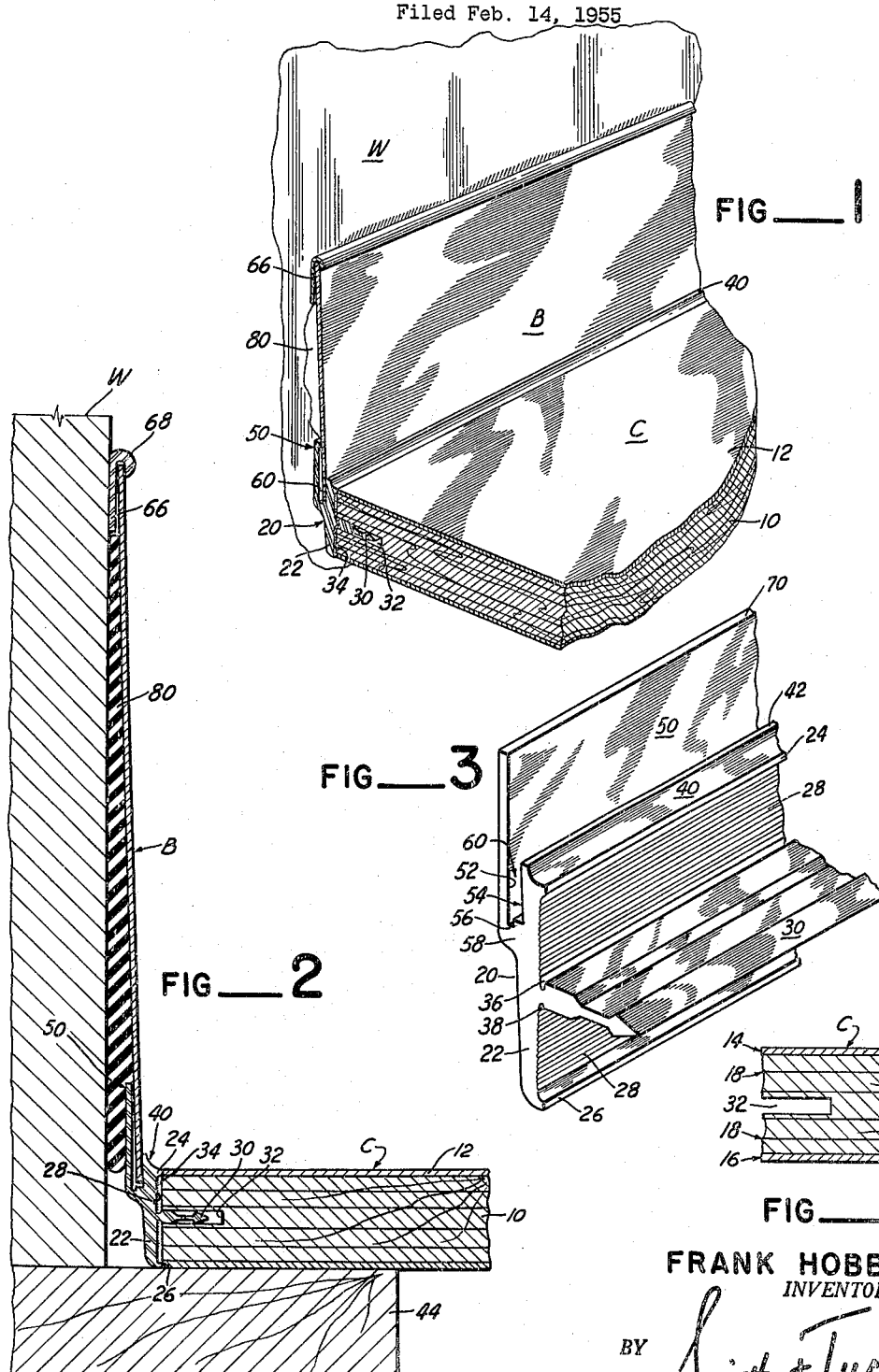
FRANK HOBBS
INVENTOR.
BY *Smith & Tuck*

3,007,213
JUNCTION MOLDING
Frank Hobbs, Seattle, Wash., assignor to Colotrym Company, Seattle, Wash., a corporation of Washington
Filed Feb. 14, 1955, Ser. No. 487,967
2 Claims. (Cl. 20—74)

My invention relates to metal holdings for laminating purposes and, more particularly, to a junction molding. Briefly, this molding comprises a metal body having a channel to receive the lower margin of a back-splash panel and having a lower, forwardly extending arrow-headed anchor flange to be secured and embedded in a kerf in a counter rear edge. The molding provides a small visible cove and secures the back-splash panel without apparent distortion despite unevenness in the wall it covers.

This invention is used principally, for example, in forming a joint between a kitchen counter and a back-splash panel. However, the junction molding finds application in other similar installations, i.e., the bathroom, the laundry and restaurant fixtures where a counter is to be joined to a backing panel.

In most buildings the walls are not perfectly true vertically and horizontally. In custom-built kitchen cabinets it is common to scribe the rear edge of the counter top to conform to wall irregularities and then to cut the counter on the scribed line. This is a laborious task and, oftentimes, the irregular line of joinder or distortions in a reflective back-splash covering will be apparent to the eye. Further, it is difficult to shape a molding for this irregular joinder and to obtain good appearance of and adequate sealing by the molding.

With the use of highly polished counters, i.e., with a plastic top ply, irregularity in light reflection is noticeable if surfaces are distorted. Metal moldings used for joinder of these parts also have reflective surfaces which make distortions apparent. When a plastics laminate is bonded to the surface of a heavy plywood panel to hard surface the counter top, the rear edge can be milled straight and true. Other than for the irregularities of the wall surface, there is no reason why the parts could not be joined with such exactness as to have no perceptible irregularity in reflected light. Various solutions have been proposed for this problem, i.e., resurfacing the walls with rigid flat panels spanning the irregularities of the wall. However, the previous solutions have been expensive, imperfect or have caused additional problems.

The objects of my invention include, therefore: to provide an improved back-splash junction molding which is readily attachable to the rear edge of the counter top and to the back-splash panel, which forms the junction securely under conditions of pressure, lack of support and settling; to devise a junction molding receiving the lower edge of a back-splash panel and holding it to a true line established by the rear edge of the counter top; and to provide a junction molding which is of improved appearance of a "fine line" type and of economical construction and installation.

My invention will be best understood, together with additional objectives thereof, from a reading of the following description, read with reference to the drawings, in which:

FIGURE 1 is a perspective view, with parts cut away and shown in section, of a specific embodiment of my junction molding;

FIGURE 2 is an enlarged vertical section through the junction molding as it appears associated with counter and wall members;

FIGURE 3 is a substantially enlarged perspective view, in fragmentary form, showing the details of construction of the junction molding; and FIGURE 4 is a detail cross-section of a rear portion of a laminated counter member.

As stated in more detail before, unevenness in a wall backing a counter top has previously been accommodated by scribing the counter deck to match the wall contour or by back-filling of the wall to obtain a straight line at the cove joinder molding. FIGURE 1 shows a wall W which commonly has surface irregularities due to uneven plastering or misalignment of studding when the wall is covered with plywood, plasterboard or the like. The counter C usually comprises a wood panel 10 having an upper surface formed by a synthetic laminate 12. Panel 10 may comprise a series of plies of natural wood or it may be hardboard. The covering sheet 12 may be linoleum or plastic, such as "Formica" or the like.

Usually the upper and lower rear edges 14, 16 of counter C may be milled perfectly true as no cross-grain will appear in these margins. Intermediate upper and lower margins 14, 16 of the counter rear face, as at 18, there may be irregularities caused by cutting cross-grain of a wood ply so that protuberances and depressions are formed.

To compensate for imperfections in the milled rear face of counter C, my junction molding 20 is provided with a front wall 22 having upper and lower marginal ribs 24, 26 disposed slightly in advance of the plane of surfaces 28 therebetween. This means that margins 24, 26 will abut the true milled surfaces 14, 16 of the counter rear face and the intermediate surfaces 28 are separated slightly to accommodate irregularities in the corresponding intermediate areas 18 of the counter top rear face.

Front wall 22 of molding 20 is secured to counter C by a medial, horizontal, arrow-headed anchor flange 30 which is wedged in a medial kerf 32 in counter C. Additional securing is obtained through the use of an adhesive at 34 between wall surfaces 28, 18 of the molding and counter top. Intermediate recessed surfaces 28 of front wall 22 have a multiplicity of fine ribs or knurling for improved bonding of the adhesive.

Flange 30 has grooves 36, 38 at its joinder with molding front wall 22 so that sections of the flange may be removed to facilitate curving the molding to round a corner. By cutting laterally through flange 30 to grooves 36, 38 and then by twisting or rolling the separated portion of the flange along longitudinal grooves 36, 38 with pliers, the flange will separate or tear along grooves 36, 38 without undue effort.

Front molding wall 22 is topped with a fillet surface 40 which fairs upwardly and rearwardly from the top of the finish laminate 12 and terminates with a narrow, fairly sharp edge 42. Fillet 40 is of narrow width relative the other parts and is known as a "fine line" molding because of the minimum exposed surface. The narrow exposure is frequently preferred for aesthetic reasons over junction moldings which, of necessity, by their construction, expose more metal work, and it reduces obviousness of the junction. Ordinarily fillet 40 is formed as a cove, as shown.

Counter C frequently sits on a framing member 44. Junction molding 20 is usually spaced approximately ¼ inch from wall W even when the irregularities of the wall do not necessitate such wide spacing. This is to provide room so that back-splash panel B may bent or flexed over the molding back wall 50 to tense the forward face of the back-splash panel to prevent noticeable longitudinal distortion of the panel.

With the described means for securing molding 20 to the counter top and the substantial thickness of the wall 22, the junction molding is held securely relative the counter against all strains to which it may be subjected and against settling of supports. The upper joinder edges 24, 14 of molding and counter being true and in close abutment and being backed with a layer of adhesive between intermediate surfaces 28, 18, no room is provided for the lodging of debris or for leakage of water into the joint. The milling of the rear face of counter top C and the forming of kerf 32 can be done with a minimum of time. Adhesive 34 is then applied and anchor flange 30 is wedged into place. This procedure is not difficult and saves considerable labor over other methods of forming the joints.

In manufacture of the molding, back wall 50 is outstanding to the back of front wall 22 at an angle and is later bent into place so that the adjacent surfaces 52, 54 are substantially parallel. On occasion the wall 50 may be canted forward to overlie the fillet edge 42. A small inside groove 56 at the bottom of back wall 50 facilitates the bending of the wall into place. The parallel, spaced surfaces 52, 54 of back wall 50 and front wall 22, together with a web 58 joining these walls, define a channel 60 receiving the lower margin of back-splash panel B.

Back-splash panel B may be formed of prefinished hardboard or other synthetic sheets 1⅛" or less in thickness, which are fairly rigid but capable of some bending or flexing under force. The upper margin of panel B is secured by a cap molding 66 having an overturned lip 68 catching the upper edge of panel B. In installation, the panel is first slipped into channel 60, then either the upper edge is snapped into place behind lip 68 of cap molding 66 or the cap molding has vertically elongated slots in which screws are secured and the molding is driven down over the upper edge of panel B.

Back-splash panel B is commonly 12" to 18" in height, but of course may be narrower or wider. Back wall 50 of molding 20 extends above front wall 22 so that its upper inner edge 70 forms a fulcrum over which panel B is slightly bent, tensing the forward face of panel B. This brings the panel's lower front edge firmly into engagement with molding wall 22, forming a seal against water or food particles.

The tensing of the face of panel B serves the further purpose of preventing longitudinal distortion due to irregularity in the portion of wall W to which cap molding 66 is secured. The least possible distortion will appear at the lower portion of panel B because of the abutment with the straight fulcrum edge 70 and with the molding wall 22. Oftentimes cabinet shelves will be arranged above the back-splash panel covering the upper portion of the panel or shading it, so it is particularly important to have the lower surface without visible distortion.

To more clearly illustrate the structure, certain parts are exaggerated, and panel B may not be as sharply inclined as shown in FIGURE 2. Sometimes it is desirable to form rear wall 50 of the molding with its upper portion advanced a few degrees forward of vertical so that the panel is tensed over fulcrum 70 even if panel B is more nearly vertical than shown.

A backing support for the medial portion of panel B may be provided by a mastic 80. The mastic shown in FIGURE 2 is horizontally combed providing air pockets permitting the panel to adjust to a natural position before the mastic becomes stiff. Reference is made to my Patent No. 2,531,128 on the support of panels with combed mastic for a more full explanation of the advantages and techniques of its application. Most persons skilled in the art will be familiar with this process from the disclosure of my invention.

Panel B is securely supported against distortion or against leakage between the panel and the molding, and light reflected from the panel will not be noticeably distorted. The parts may settle due to structural or ground adjustment without the junction becoming separated, losing its seal or marring the appearance.

From the foregoing it will be understood how the objectives of my invention are met, together with additional objectives and advantages thereof. I do not wish to be limited to the precise details of construction shown, but wish to cover those modifications which will occur to those skilled in the art which are properly within the scope of my invention, as described in the appended claims.

I claim:

1. A fine-line junction molding to join the lower margin of a thin, resilient back-splash panel to the rear edge of a horizontal counter top, comprising: a molding body having an upright front wall and an upright back wall in spaced, substantially parallel relationship and a web joining the bottom of the back wall to the front wall intermediate upper and lower margins thereof whereby there is formed between the front and back walls a channel to receive the lower margin of the back-splash panel, the back wall rising substantially above said web and above said front wall whereby its straight top front edge forms a fulcrum over which a back-splash panel may be bent to tense the face thereof, said front wall having a horizontal, medial, forward projecting arrow-headed anchor flange to be secured in a kerf in a counter top rear edge, said front wall being topped by a narrow exposed cove surface disposed to fair upwardly and rearwardly from a counter top, the front face of said front wall between upper and lower margins and said flange having a multiplicity of fine ribs for receiving and bonding an adhesive between the molding body and a counter top rear edge, said upper and lower margins being slightly advanced relative said ribs for full abutment with a counter top rear edge milled to a straight line to form a base of reference.

2. A junction assembly bridging the rear face of a horizontal counter top and a thin, resilient back-splash panel covering an adjacent area of a building wall, comprising: a molding body having upright front and back walls in spaced, substantially parallel relationship and a web joining the bottom of the back wall to the front wall intermediate upper and lower margins thereof defining a channel and the lower margin of said back-splash panel positioned in said channel and spaced from said building wall, the back wall rising substantially above said web and above said front wall and its straight top front edge forming a fulcrum over which the back-splash panel is bent with its forward face tensed and with its lower margin pressing against the front surface of said channel, and a cap molding fastened to said building wall and securing the upper margin of said back-splash panel, said front wall having a horizontal, medial, arrow-headed flange and the rear face of said counter top milled to a straight line to form a base of reference and having a medial kerf in which said flange is wedged, said front wall being topped by a narrow cove surface disposed to fair upwardly and rearwardly from the counter top and forming the only exposed surface of the molding, the front face of said front wall between upper and lower margins and said flange having a multiplicity of ribs and an adhesive bonding the ribbed molding surfaces and the counter top rear face, said upper and lower margins of the front face being slightly advanced of the area of said ribs and being abutted to upper and lower margins of the straight line milled counter top rear face.

References Cited in the file of this patent

UNITED STATES PATENTS

| | | | |
|---|---|---|---|
| D. 117,686 | Bonnell | Nov. 21, | 1939 |
| 1,989,814 | MacNab | Feb. 5, | 1935 |
| 2,428,731 | Abrams | Oct. 7, | 1947 |
| 2,549,414 | Bonnell | Apr. 17, | 1951 |
| 2,608,777 | Schuler | Sept. 2, | 1952 |
| 2,705,820 | Torrence | Apr. 12, | 1955 |

OTHER REFERENCES

Aluminum Moldings, Aug. 30, 1928, page 26, #K-862.
Architectural Record, page 229, September 1948.